(12) United States Patent
Huebner

(10) Patent No.: US 11,507,711 B2
(45) Date of Patent: Nov. 22, 2022

(54) CUSTOMIZABLE VIRTUAL 3-DIMENSIONAL KITCHEN COMPONENTS

(71) Applicant: Dollypup Productions, LLC, Bowie, MD (US)

(72) Inventor: Christopher Allen Huebner, Bowie, MD (US)

(73) Assignee: DOLLYPUP PRODUCTIONS, LLC., Bowie, MD (US)

( * ) Notice: Subject to any disclaimer, the term of this patent is extended or adjusted under 35 U.S.C. 154(b) by 0 days.

(21) Appl. No.: 16/453,564

(22) Filed: Jun. 26, 2019

(65) Prior Publication Data
US 2019/0354652 A1 Nov. 21, 2019

Related U.S. Application Data

(63) Continuation-in-part of application No. 15/983,314, filed on May 18, 2018.

(51) Int. Cl.
*G06F 30/13* (2020.01)
*G06T 19/20* (2011.01)
*G06F 111/20* (2020.01)

(52) U.S. Cl.
CPC .............. *G06F 30/13* (2020.01); *G06T 19/20* (2013.01); *G06F 2111/20* (2020.01); *G06T 2210/04* (2013.01); *G06T 2219/2004* (2013.01)

(58) Field of Classification Search
CPC ...... G06F 30/13; G06F 2111/20; G06T 19/20; G06T 2210/04; G06T 2219/2004
(Continued)

(56) References Cited

U.S. PATENT DOCUMENTS 6,134,593 A 10/2000 Alexander
6,204,763 B1 3/2001 Sone
(Continued)

FOREIGN PATENT DOCUMENTS

AT 501039 5/2006
AT 008481 8/2006
(Continued)

OTHER PUBLICATIONS

Dassault Systemes. "Introducing SolidWorks." 2015. Wayback machine Jul. 12, 2017. Accessed on May 7, 2022 at https://web.archive.org/web/20170712123739/https://my.solidworks.com/solidworks/guide/SOLIDWORKS_Introduction_EN.pdf. pp. 1-127. (Year: 2015).*
(Continued)

*Primary Examiner* — John E Johansen
(74) *Attorney, Agent, or Firm* — Fitch, Even, Tabin & Flannery, LLP

(57) ABSTRACT

A control circuit provides a user with an opportunity to create a custom virtual three-dimensional kitchen component selected from a categorical list of available customizable kitchen components. Upon detecting the user's assertion of the opportunity, the control circuit automatically provides the user with an interactive form that includes a plurality of selectable features for the selected customizable kitchen component. Upon receiving user entries regarding the plurality of selectable features, the control circuit automatically defines a customized virtual three-dimensional kitchen component that comports with the user entries. By one approach the control circuit accesses information that describes a merged three-dimensional kitchen component that comprises an aggregation of all available user-selectable features for that particular categorical component The control circuit then employs the user entries to delete unselected ones of the user-selectable features from this merged three-
(Continued)

dimensional kitchen component to thereby define the customized virtual three-dimensional kitchen component.

19 Claims, 9 Drawing Sheets

(58) Field of Classification Search
USPC .......................................................... 703/1
See application file for complete search history.

(56) References Cited

U.S. PATENT DOCUMENTS

| | | | |
|---|---|---|---|
| 6,529,949 B1 | 3/2003 | Getsin | |
| 6,574,455 B2 | 6/2003 | Jakobsson | |
| 6,793,253 B2 | 9/2004 | Bruwer | |
| 6,853,853 B1 | 2/2005 | Van Wiemeersch | |
| 6,909,356 B2 | 6/2005 | Brown | |
| 6,922,701 B1* | 7/2005 | Ananian | G06F 30/13 |
| 6,950,725 B2 | 9/2005 | Von Kannewurff | |
| 6,952,181 B2 | 10/2005 | Karr | |
| 6,965,294 B1 | 11/2005 | Elliott | |
| 6,967,562 B2 | 11/2005 | Menard | |
| 6,987,452 B2 | 1/2006 | Yang | |
| 7,035,916 B1 | 4/2006 | Backman | |
| 7,120,697 B2 | 10/2006 | Aiken, Jr. | |
| 7,149,959 B1 | 12/2006 | Jones | |
| 7,170,998 B2 | 1/2007 | McLintock | |
| 7,193,644 B2 | 3/2007 | Carter | |
| 7,205,908 B2 | 4/2007 | Tsui | |
| 7,212,889 B2 | 5/2007 | Mann | |
| 7,237,013 B2 | 6/2007 | Winkeler | |
| 7,260,835 B2 | 8/2007 | Bajikar | |
| 7,269,634 B2 | 9/2007 | Getsin | |
| 7,379,805 B2 | 5/2008 | Olsen, III | |
| 7,553,173 B2 | 6/2009 | Kowalick | |
| 7,735,732 B2 | 6/2010 | Linton | |
| 7,746,223 B2 | 6/2010 | Howarter | |
| 7,786,891 B2 | 8/2010 | Owens | |
| 7,788,221 B2 | 8/2010 | Tanaka | |
| 7,847,675 B1 | 12/2010 | Thyen | |
| 8,018,329 B2 | 9/2011 | Morgan | |
| 8,044,782 B2 | 10/2011 | Saban | |
| 8,045,961 B2 | 10/2011 | Ayed | |
| 8,093,986 B2 | 1/2012 | Harvey | |
| 8,255,338 B1 | 8/2012 | Brittan | |
| 9,322,194 B2 | 4/2016 | Cheng | |
| 9,322,201 B1 | 4/2016 | Cheng | |
| 9,326,094 B2 | 4/2016 | Johnson | |
| 9,359,794 B2 | 6/2016 | Cheng | |
| 9,382,739 B1 | 7/2016 | Johnson | |
| 9,447,609 B2 | 9/2016 | Johnson | |
| 9,470,018 B1 | 10/2016 | Cheng | |
| 9,530,262 B2 | 12/2016 | Johnson | |
| 9,530,295 B2 | 12/2016 | Johnson | |
| 9,644,399 B2 | 5/2017 | Johnson | |
| 9,647,996 B2 | 5/2017 | Johnson | |
| 9,652,917 B2 | 5/2017 | Johnson | |
| 9,683,391 B2 | 6/2017 | Johnson | |
| 9,704,320 B2 | 7/2017 | Johnson | |
| 9,727,328 B2 | 8/2017 | Johnson | |
| 9,779,571 B2 | 10/2017 | Chong | |
| 9,916,746 B2 | 3/2018 | Johnson | |
| 10,138,671 B2 | 11/2018 | Fitzgibbon | |
| 10,198,863 B2* | 2/2019 | Ullom | G06T 9/001 |
| 10,382,608 B2 | 8/2019 | Gerhardt | |
| 10,708,410 B2 | 7/2020 | Gerhardt | |
| 2001/0040422 A1 | 11/2001 | Gramlich | |
| 2002/0147919 A1 | 10/2002 | Gentry | |
| 2002/0152390 A1 | 10/2002 | Furuyama | |
| 2002/0177460 A1 | 11/2002 | Beasley | |
| 2002/0180582 A1 | 12/2002 | Nielsen | |
| 2003/0007851 A1 | 1/2003 | Heigl | |
| 2003/0033163 A1* | 2/2003 | Habiby | G06Q 30/02 |
| | | | 705/1.1 |
| 2004/0057567 A1 | 3/2004 | Lee | |
| 2004/0066328 A1 | 4/2004 | Galley | |
| 2004/0168083 A1 | 8/2004 | Gasparini | |
| 2005/0006908 A1 | 1/2005 | Bruwer | |
| 2005/0060063 A1 | 3/2005 | Reichelt | |
| 2005/0080898 A1 | 4/2005 | Block | |
| 2005/0149741 A1 | 7/2005 | Humbel | |
| 2005/0172462 A1 | 8/2005 | Rudduck | |
| 2005/0199019 A1 | 9/2005 | Marcelle | |
| 2005/0204787 A1 | 9/2005 | Ernst | |
| 2005/0258935 A1 | 11/2005 | Hom | |
| 2006/0058012 A1 | 3/2006 | Caspi | |
| 2006/0101742 A1* | 5/2006 | Scott-Leikach | G06F 30/18 |
| | | | 52/235 |
| 2006/0170533 A1 | 8/2006 | Chioiu | |
| 2006/0176016 A1 | 8/2006 | Kok | |
| 2006/0190419 A1 | 8/2006 | Bunn | |
| 2006/0255912 A1 | 11/2006 | Simms | |
| 2007/0022438 A1 | 1/2007 | Arseneau | |
| 2007/0176739 A1 | 8/2007 | Raheman | |
| 2007/0179758 A1* | 8/2007 | Neumann | G06F 30/00 |
| | | | 703/1 |
| 2007/0193834 A1 | 8/2007 | Pai | |
| 2008/0072170 A1 | 3/2008 | Simons | |
| 2008/0168271 A1 | 7/2008 | Sherburne | |
| 2008/0180460 A1* | 7/2008 | Ford | G06F 30/00 |
| | | | 345/660 |
| 2008/0247345 A1 | 10/2008 | Bahar | |
| 2008/0298230 A1 | 12/2008 | Luft | |
| 2009/0037217 A1 | 2/2009 | Naik | |
| 2009/0160856 A1* | 6/2009 | Hoguet | G06Q 10/06 |
| | | | 345/420 |
| 2009/0231093 A1 | 9/2009 | Keller, Jr. | |
| 2009/0251281 A1 | 10/2009 | Fitzgibbon | |
| 2010/0075655 A1 | 3/2010 | Howarter | |
| 2010/0148641 A1* | 6/2010 | Ehmke | A47B 77/02 |
| | | | 99/380 |
| 2010/0176919 A1 | 7/2010 | Myers | |
| 2010/0198563 A1* | 8/2010 | Plewe | G06F 30/17 |
| | | | 703/1 |
| 2010/0201536 A1 | 8/2010 | Robertson | |
| 2010/0250929 A1 | 9/2010 | Schultz | |
| 2010/0274570 A1 | 10/2010 | Proefke | |
| 2010/0278457 A1 | 11/2010 | Greco | |
| 2010/0283560 A1 | 11/2010 | Sommer | |
| 2010/0283580 A1 | 11/2010 | Sheng | |
| 2010/0306549 A1 | 12/2010 | Ullmann | |
| 2011/0060480 A1 | 3/2011 | Mottla | |
| 2011/0084836 A1 | 4/2011 | Fitzgibbon | |
| 2011/0106329 A1 | 5/2011 | Donnelly | |
| 2011/0165896 A1 | 7/2011 | Stromberg | |
| 2011/0166700 A1 | 7/2011 | Dunn | |
| 2011/0187497 A1 | 8/2011 | Chin | |
| 2011/0227712 A1 | 9/2011 | Atteck | |
| 2011/0231914 A1 | 9/2011 | Hung | |
| 2011/0252843 A1 | 10/2011 | Sumcad | |
| 2011/0307281 A1* | 12/2011 | Creveling | G06Q 10/063 |
| | | | 707/790 |
| 2011/0311052 A1 | 12/2011 | Myers | |
| 2012/0007735 A1 | 1/2012 | Rhyins | |
| 2012/0280783 A1 | 11/2012 | Gerhardt | |
| 2012/0280789 A1 | 11/2012 | Gerhardt | |
| 2012/0280790 A1 | 11/2012 | Gerhardt | |
| 2013/0024222 A1 | 1/2013 | Dunn | |
| 2014/0265359 A1 | 9/2014 | Cheng | |
| 2014/0365773 A1 | 12/2014 | Gerhardt | |
| 2015/0102906 A1 | 4/2015 | Gerhardt | |
| 2015/0145993 A1 | 5/2015 | Scalisi | |
| 2015/0161695 A1* | 6/2015 | Koby | G06Q 30/0282 |
| | | | 705/26.4 |
| 2015/0169791 A1* | 6/2015 | Lavrov | G06Q 10/103 |
| | | | 703/1 |
| 2015/0181014 A1 | 6/2015 | Gerhardt | |
| 2015/0324940 A1* | 11/2015 | Samson | G06Q 10/06313 |
| | | | 705/7.23 |
| 2016/0034137 A1 | 2/2016 | Foster | |
| 2016/0185907 A1 | 6/2016 | Gupta | |
| 2016/0189071 A1 | 6/2016 | Scholar | |
| 2017/0099295 A1 | 4/2017 | Ricci | |

(56) References Cited

U.S. PATENT DOCUMENTS

| | | | |
|---|---|---|---|
| 2018/0089336 | A1 | 3/2018 | Ninomiya et al. |
| 2018/0191889 | A1 | 7/2018 | Gerhardt |
| 2018/0225408 | A1* | 8/2018 | Ziolo ............... G06F 30/00 |
| 2018/0285517 | A1 | 10/2018 | Reichental et al. |
| 2019/0051054 | A1 | 2/2019 | Jovanovic |
| 2019/0085615 | A1 | 3/2019 | Cate |
| 2019/0342443 | A1 | 11/2019 | Gerhardt |
| 2019/0354640 | A1 | 11/2019 | Huebner |
| 2020/0002997 | A1 | 1/2020 | Fitzgibbon |

FOREIGN PATENT DOCUMENTS

| | | |
|---|---|---|
| AT | 008482 | 8/2006 |
| CN | 101329779 | 12/2008 |
| CN | 101329779 A | 12/2008 |
| CN | 101719175 A * | 6/2010 |
| CN | 101719175 A | 6/2010 |
| CN | 103635940 | 3/2014 |
| CN | 103635940 A | 3/2014 |
| JP | 2004-139241 A | 5/2004 |
| JP | 2004139241 A * | 5/2004 |
| KR | 20040035952 | 4/2004 |
| KR | 1020040035952 | 4/2004 |
| WO | 0210040 | 2/2002 |
| WO | 02100040 | 12/2002 |
| WO | 02100040 A | 12/2002 |
| WO | 2006136662 | 12/2006 |
| WO | 2006136662 A | 12/2006 |
| WO | 2010144490 | 12/2010 |
| WO | 2010144490 A | 12/2010 |
| WO | 2012151290 | 11/2012 |
| WO | 2012151290 A | 11/2012 |
| WO | 2015095141 | 6/2015 |
| WO | 2017061954 A1 | 4/2017 |
| WO | WO-2017061954 A1 * | 4/2017 |

OTHER PUBLICATIONS

International Search Report and Written Opinion; PCT/US20/38931; 14 Pages; dated Aug. 28, 2020.

"Assa Abloy trials remote hotel check-ins", © 2012 AOL Inc., [online]. Retrieved from the Internet: <URL: http://www.engadget.com/2010/11/02/assa-abloy-trials-remote-hotel-check-ins-unlocking-your-room-wi/>, (Accessed Apr. 23, 2012), 2 pgs.

"Cell phone controlled door lock", Copyright © 2012, Hack a Day, [online]. Retrieved from the Internet: <URL: http:J/hackaday.com/2007/07/17/cell-phone-controlled-door-lock/>, Accessed Apr. 23, 2012), 11 pgs.

"Chinese Application Serial No. 201280032878.2, Office Action dated May 11, 2015", w/English Translation, 14 pgs.

"Chinese Application Serial No. 201280032878.2, Office Action dated Sep. 26, 2018", w/English Translation, 14 pgs.

"ECKey—Turn your phone into a Key!", [online}. Retrieved from the Internet: <URL: http://www.eckev.com/>, (Accessed Apr. 23, 2012), 2 pgs.

"IDoor—iPhone Controlled Hydraulic Door", http://varenhor.st/ 2009 /07 /idoor-i phone-contro lied-hydraulic-door/, retrieved Apr. 23, 2012, 12 pages.

"IDoor—iPhone Controlled Hydraulic Door", Chris Varenhorst chris@localhost, [online]. Retrieved from the Internet: <URL: http://varenhor.st/2009/07/idoor-iphone-controlledhydraulic-door/>, (Accessed Apr. 23, 2012), 12 pgs.

"Keyless entry via SMS", Copyright © 2012, Hack a Day, [on line]. Retrieved from the Internet: <URL: http://hackaday.com/2011 / 01 /24/keyless-entry-via-sms/, (Accessed Apr. 23, 2012), 9 pgs.

"Knock detecting lock", Copyright © 2012, Hack a Day, [online]. Retrieved from the Internet: <URL: http://hackaday.com/2009/ 11 /04/knock-detecting-lock/>, (Accessed Apr. 23, 2012), 10 pgs.

"Knock response automatic door opener", Copyright © 2012, Hack a Day, [on line]. Retrieved from the Internet: <URL: http://hackaday.com/2007/06/11/knock-responseautomatic-door-opener/>, (Accessed Apr. 23, 2012), 9 pgs.

"More cellphone controlled door locks", Copyright © 2012, Hack a Day, [online]. Retrieved from the Internet: <URL: http://hackaday.com/2010/02/23/more-cellphone-controlled-doorlocks/>, (Accessed Apr. 23, 2012), 10 pgs.

"Nexia Home Intelligence", Nexia™, [online]. Retrieved from the Internet: <URL: http://www.nexiahome.com/Products/ProductCatalog.aspx?catsel=5>, (Accessed Apr. 23, 2012), 2 pgs.

"Oliver Nash's Blog", [online]. Retrieved from the Internet: <URL: http ://ocfnash. wordpress .com/2009/10/31 /locked-out-at-2am/>, (Accessed Apr. 23, 2012), 18 pgs.

"Open Ways", OpenWays copyright 2011 , [online]. Retrieved from the Internet: <URL: http://www.openways.com/>, (Accessed Apr. 20, 2012), 1 pg.

"Opening a door via text message", [online]. Retrieved from the Internet: <URL: http://anerroroccurredwhileprocessingthis directive .com/2011 /01/01 /opening-a-door-via-textmessage/>, (Accessed Apr. 23, 2012), 8 pgs.

"Phantom Keyless Home Entry", Copyright © 2012 Phantom Smart Home, LLC, [online]. Retrieved from the Internet: <URL: http:// phantomsmarthome.com/, (Accessed Apr. 23, 2012), 1 pg.

"Remote entry via Android and Launchpad", Copyright © 2012, Hack a Day, [online]. Retrieved from the Internet: <URL: http:// hackaday.com/2 0 12/01/24/remote-entry-viaandroid-and-launchpad/>, (Accessed Apr. 23, 2012), 9 pgs.

"SimpliciKey Electronic Door Look Solutions", Copyright © 2011 SimpliciKey TM, [online ]. Retrieved from the Internet: <URL: http://simplicikey.com/>, (Accessed Apr. 23, 2012), 1 pg.

"Unlock you door with Siri, SMS, or a secret knock",© 201 O laan labs, [online]. Retrieved from the Internet: <URL: http://labs.laan.com/wp/2011/10/unlock-your-door-with-siri-sms-ora-secret-knock/>, (Accessed Apr. 23, 2012). 11 pgs.

"USB Auth—Makers Local 256", Wiki pages, [online]. Retrieved from the Internet: <URL: https://256.makerslocal.ori:i/wiki/index. php/USB Auth>, (Accessed Apr. 23, 2012), 9 pgs.

"Viper Smartstart", © Copyright 2012 Directed., [online]. Retrieved from the Internet: <URL: http://www.vioer.com/smartstartl>, (Accessed Apr. 23, 2012), 2 pgs.

"Yale demos NFC-enabled residential locks, germaphobes rejoice", © 2012 AOL Inc, onlinel. Retrieved from the Internet: <URL:, (Accessed Apr. 23, 2012), 4 pgs.

"Zwave Products", Copyrights © 2012—Zwave Products Inc, [online]. Retrieved from the Internet: <URL: http://www.zwaveoroducts.com/KWIKSET.html>, (Accessed Apr. 23, 2012), 3 pgs.

U.S. Appl. No. 13/462,669 , Response filed Nov. 19, 2013 to Non Final Office Action dated Aug. 26, 2013; 12 pgs.

U.S. Appl. No. 13/462,669, Examiner Interview Summary dated Nov. 14, 2013, 3 pgs.

U.S. Appl. No. 13/462,669, Non Final Office Action dated Aug. 26, 2013, 17 pgs.

U.S. Appl. No. 13/462,669, Response filed Nov. 19, 2013 to Non Final Office Action dated Aug. 26, 12013, 12 pgs.

U.S. Appl. No. 13/462,714, Non Final Office Action dated Aug. 26—pgs, 17 pages.

U.S. Appl. No. 14/508,501, Non Final Office Action dated Mar. 6, 2015, 15 pgs.

English Abstract of KR 20040035952; Dated Apr. 30, 2004.

International Application Serial No. PCT/722012/036141, International Search Report dated Apr. 9, 2012, 5 pages.

International Application Serial No. PCT/US2012/036141 , International Preliminary Report on Patentability dated Nov. 5, 2013, 7 pgs.

International Application Serial No. PCT/US2012/036141, International Search Report dated Sep. 4, 2012, 5 pgs.

International Application Serial No. PCT/US2012/036141, Written Opinion dated Sep. 4, 2012, 6 pgs.

Phantom Smart Snarl Home; Hands-Free Keyless Home Entry, https://web.archive.org/web/20110222072442/http:/www.phantomsmarthome.com/; 3 pages, copyright 2011.

Sorex_wirelessKey_2_0-Sorex Wayback site of Sep. 6, 2011, 2 pages.

SOREX_wirelessKey_Folder_2009, 2 pages.

U.S. Appl. No. 13/462,714, Non-Final Office Action dated Aug. 26, 2013, 17 pages.

(56) References Cited

OTHER PUBLICATIONS

U.S. Appl. No. 13/462,669, Final Office Action dated Feb. 24, 2014, 22 pgs.
U.S. Appl. No. 13/462,669, Non Final Office Action dated Aug. 26, 2013, 18 pgs.
U.S. Appl. No. 13/462,714, Examiner Interview Summary dated Mar. 7, 2014, 3 pgs.
U.S. Appl. No. 13/462,714, Final Office Action dated Apr. 7, 2014, 20 pgs.
U.S. Appl. No. 13/462,714, Non Final Office Action dated Aug. 26, 2013, 17 pgs.
U.S. Appl. No. 13/462,714, Response filed Feb. 26, 2014 to Non Final Office Action dated Aug. 26, 2013, 15 pgs.
U.S. Appl. No. 13/462,765, Non Final Office Action dated Sep. 4, 2014, 11 pgs.
U.S. Appl. No. 14/468,114, Final Office Action dated Mar. 15, 2016, 13 pgs.
U.S. Appl. No. 14/468,114, Non Final Office Action dated Jul. 21, 2016, 11 pgs.
U.S. Appl. No. 14/468,114, Preliminary Amendment filed Aug. 27, 2014, 7 pgs.
U.S. Appl. No. 14/638,828, Examiner Interview Summary dated Mar. 4, 2016, 3 pgs.
U.S. Appl. No. 14/638,828, Final Office Action dated May 16, 2016, 15 pgs.
U.S. Appl. No. 14/638,828, Non Final Office Action dated Jan. 11, 2017, 13 pgs.
U.S. Appl. No. 14/638,828, Non Final Office Action dated Oct. 26, 2015, 11 pgs.
U.S. Appl. No. 14/638,828, Response filed Feb. 26, 2016 to Non Final Office Action dated Oct. 26, 2015, 12 pgs.
U.S. Appl. No. 14/638,828, Response Filed Nov. 16, 2016 to Final Office Action dated May 16, 2016, 12 pgs.
U.S. Appl. No. 16/511,772; Notice of Allowance dated Feb. 27, 2020; (pp. 1-5).
U.S. Appl. No. 16/511,772; Notice of Allowance dated Nov. 20, 2019; (pp. 1-5).
WirelessKey Hardware Deutsch 1.1 Sep. 6, 2011 Wayback Machine, (with Google Machine Translation) 34 pages.
YouTube Video entitled Bluetooth Sorex Wirelss Key, dated Mar. 5, 2009, 5 pages.
YouTube Video entitled Bluetooth SorexLoXX Entrance System, dated Mar. 5, 2009, 9 pages.
YouTube Video entitled Bluetooth-Sorex LoXX dated Feb. 5, 2009, 8 pages.
Commercial Kitchen Guide; Minnesota Institute for Sustainable Agriculture (MISA); http://misadocuments.info/Commercial_Kitchen_Guide.pdf; known at least as early as Dec. 14, 2020, 32 pages.
Food Establishment Plan Review Manual; http://www.foodprotect.org/media/guide/2016-plan-review-manual.pdf; 2016 version; 45 pages.
Go! Foodservice Restaurant Equipment and Supplies; Commercial vs. Residential Range Buying Guide; https://www.gofoodservice.com/guides/commercial-vs-residential-ranges-guide Believed to be known at least as early as Jan. 17, 2020, Foodservice; 8 pages.
IBISWorld; Commercial Cooking Equipment Manufacturing Industry in the US; https//www.ibisworld.com/united-states/market-research-reports/commercial-cooking-equipment-manufacturing-industry/; Sep. 29, 2020; 11 pages.
North American Association of Food Equipment Manufacturers (NAFEM); NAFEM Overview; https://www.nafem.org/wp-content/uploads/2020/07/NAFEM-Fact-Sheet_2020-1 pdf; Known at least as early as Jul. 2020, 2 pages.
NSF; Food Equipment Certification; https://www.nsf.org/testing/food/product-certification/food-equipment/food-equipment-certification; Known at least as early as Dec. 14, 2020, NSF International; 3 pages.
NSF; Food Equipment Standards; https://www.nsf.org/standards-development/standards-portfolio/food-equipment-standards; Known at least as early as Dec. 14, 2020, NSF International; 6 pages.
PCT Patent Application No. PCT/US19/32409; International Search Report and Written Opinion dated Jul. 25, 2019, 9 pages.
Price My Kitchen; 3 Major Differences in a Commercial and a Residential Kitchen; https://www.pricemykitchen.com/3-major-differences-in-a-commercial-and-a-residential-kitchen/#:~:text=Commercial%20kitchens%20require%20freezers%2C%20huge,is%20no%20need%20for%20that.; Believed to be known at least as early as Sep. 2016, Commercial Kitchen Equipment Comparison, Deals, Chefs, Restaurants; 8 pages.
RestoHub; Building Codes, Accessibility, & Inspections; https://www.restohub.org/permits/building-codes-accessibility-inspections/; known at least as early as Dec. 14, 2020, 4 pages.
U.S. Public Health Servicer Food Code 2017; U.S. Food & Drug; Administrationhttps://www.fda.gov/media/110822/download; known at least as early as Dec. 31, 2017, 767 Pages.
UL; 30 Years of Foodservice Equipment Sanitation Services; https://www.ul.com/news/30-years-foodservice-equipment-sanitation-services; May 29, 2019; 4 pages.
European Patent Application No. 19804406.7; Communication Pursuant to Article 94(3) EPC dated Jan. 21, 2022; 25 Pages.
European Patent Application No. 19804406.7; Communication under R.61 or R 63 dated Dec. 22, 2021; 6 Pages.
European Patent Application No. 19804406.7; Partial Supplementary European Search Report and Opinion dated Jul. 16, 2021; 20 Pages.

\* cited by examiner

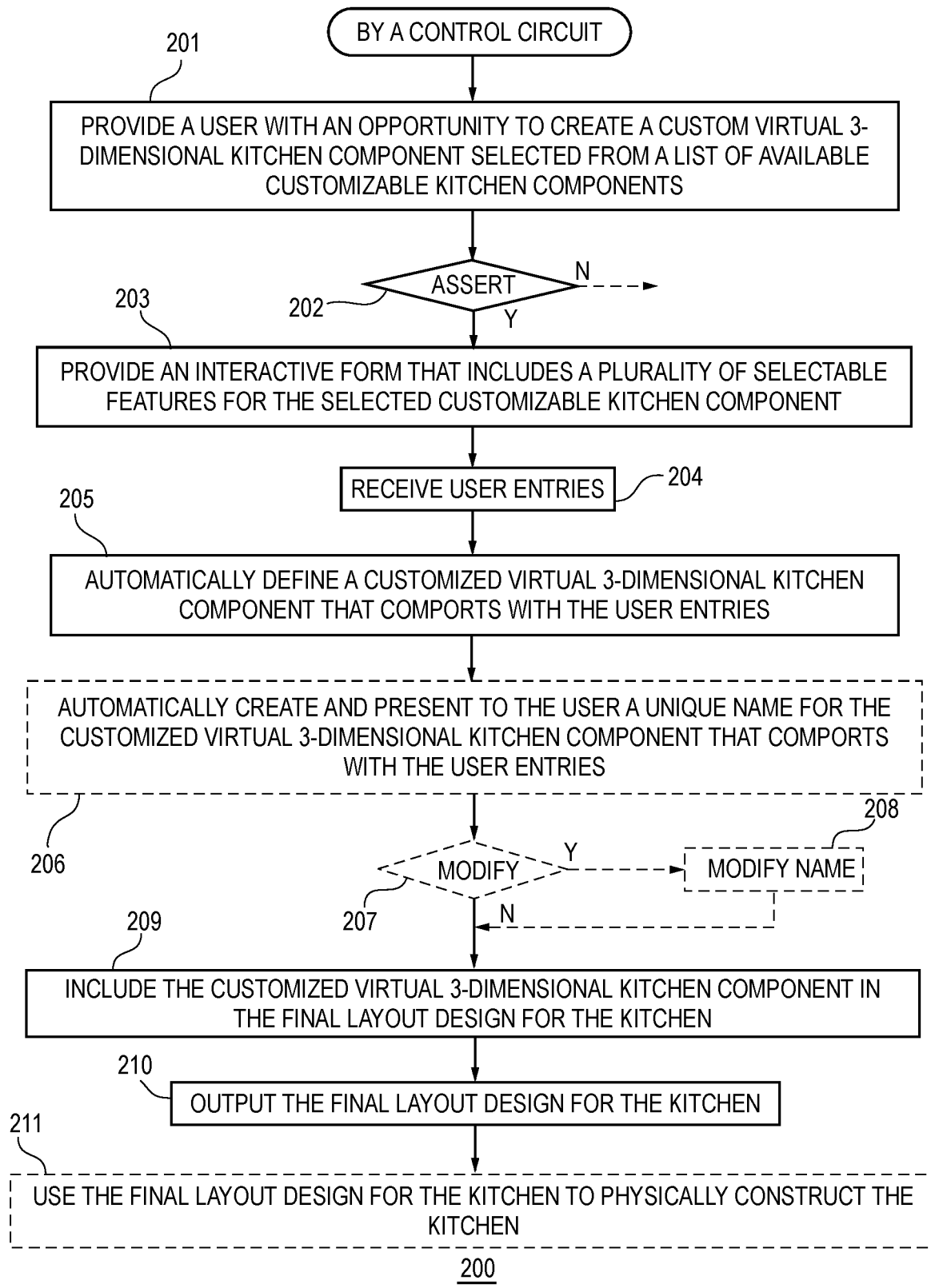

FIG. 4

| KITCHAUTOMATION-CREATE WORKABLE | ✕ |

SIZE

WIDTH (INCH): 24 — 403
LENGTH (INCH): 60 — 404
HEIGHT (INCH): 36 — 405

— 406
— 402
(three ✕ icons)

EDGE DETAIL

○ FLAT     ◉ ROLLED     ○ MARINE — 407

SPLASHES 410

☑ BACK     ☑ LEFT     RIGHT

SPLASH HEIGHT (INCH): 4 — 409

411 — ☑ CLOSE BACK OF SPLASH?
     ☑ TURN UP SPLASH?

✕ — 408

MISC

◉ CROSSBRACING     ○ ADJUSTABLE FEET
○ UNDERSHELF      ◉ CASTERS

— 412

TYPE NAME

OF_kb_CustomFab_24603604-RO-BLR-CU-BC
414

[ ? ]  [ CANCEL ]  [ CREATE ]
                        ‾ 413

105

700

CUSTOMIZABLE VIRTUAL 3-DIMENSIONAL KITCHEN COMPONENTS

RELATED APPLICATION(S)

This application is a continuation-in-part of co-pending and co-owned U.S. patent application Ser. No. 15/983,314, entitled KITCHEN CONSTRUCTION APPARATUS AND METHOD and filed May 18, 2018, which is incorporated by reference in its entirety herein.

TECHNICAL FIELD

These teachings relate generally to kitchens and more particularly to the construction of commercial food service kitchens.

BACKGROUND

Kitchens are a well-understood area of prior art endeavor. That said, modern commercial kitchens often comprise complicated and unique-to-themselves structures. The foregoing complexities are owing, at the least, to a vast variety of available appliances (each having their own specifications and installation and usage requirements), the purpose and intended usage of the kitchen (including preferences of the cooking personnel), building code requirements, and the opportunities and/or limitations that characterize a given architectural design.

Computer-aided design tools are available to help kitchen designers properly configure a given kitchen. Such tools can greatly facilitate creating an accurate and easily understood and visualized layout design plan for a commercial kitchen. Unfortunately, existing tools in these regards do not adequately meet the needs and requirements of all application settings. As but one salient example in these regards, existing tools do not typically facilitate intuitive and/or simple use of customized appliances and fixtures.

BRIEF DESCRIPTION OF THE DRAWINGS

The above needs are at least partially met through provision of the customizable virtual 3-dimensional kitchen components described in the following detailed description, particularly when studied in conjunction with the drawings, wherein.

Figure 1:
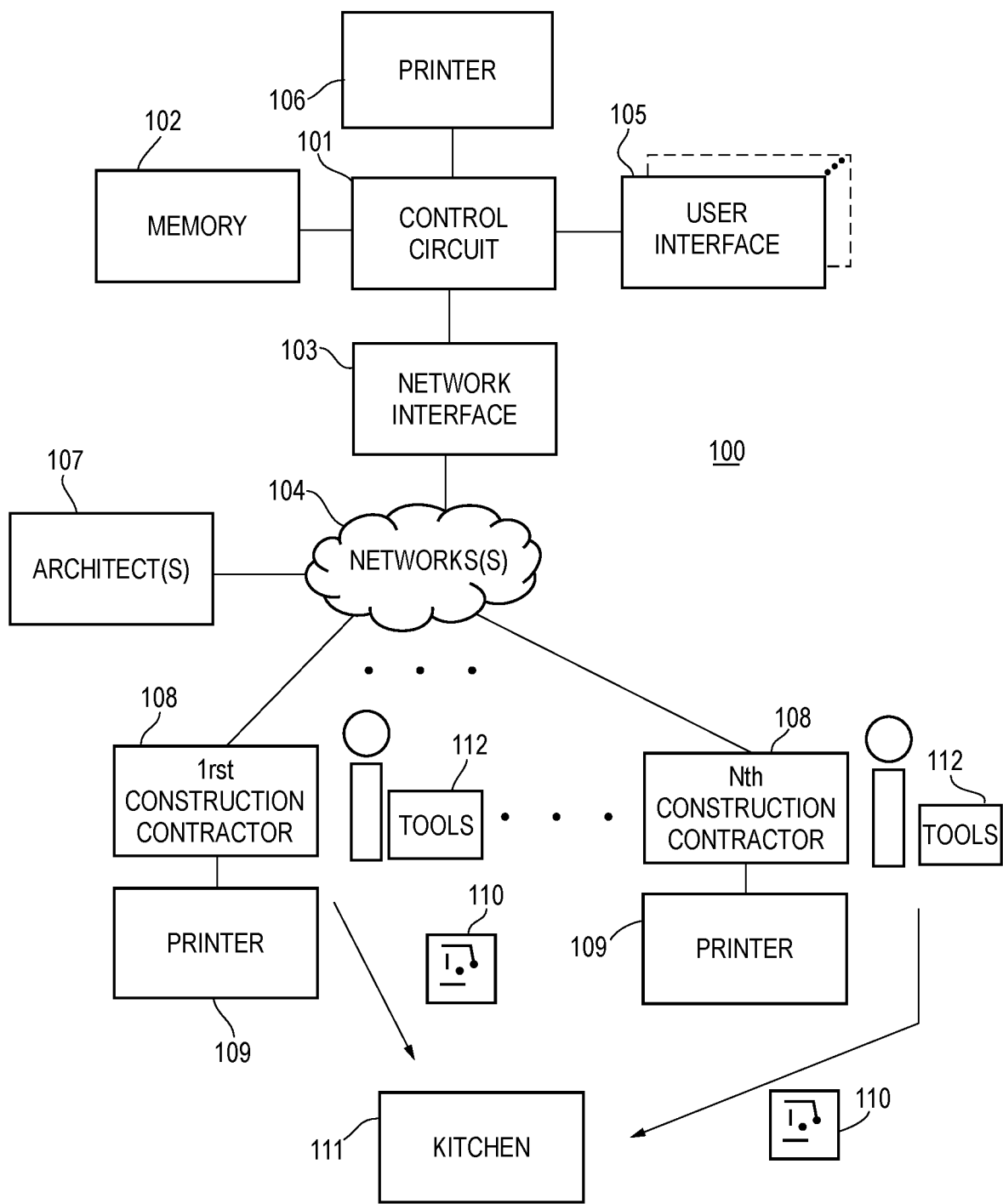
FIG. 1 comprises a block diagram as configured in accordance with various embodiments of these teachings, FIG. 2 comprises a flow diagram as configured in accordance with various embodiments of these teachings, FIGS. 3A and 3B comprise screenshots as configured in accordance with various embodiments of these teachings, FIG. 4 comprises a screenshot as configured in accordance with various embodiments of these teachings, FIG. 5 comprises a screenshot as configured in accordance with various embodiments of these teachings, FIG. 6 comprises a flow diagram as configured in accordance with various embodiments of these teachings, FIG. 7 comprises a perspective view as configured in accordance with various embodiments of the invention, FIG. 8 comprises a perspective view as configured in accordance with various embodiments of these teachings, and FIG. 9 comprises a perspective and detail view as configured in accordance with various embodiments of the invention.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein. The word "or" when used herein shall be interpreted as having a disjunctive construction rather than a conjunctive construction unless otherwise specifically indicated.

DETAILED DESCRIPTION

Generally speaking, pursuant to these various embodiments a control circuit provides a user with an opportunity to create a custom virtual three-dimensional kitchen component selected from a categorical list of available customizable kitchen components. Upon detecting the user's assertion of the opportunity, the control circuit automatically provides the user with an interactive form that includes a plurality of selectable features for the selected customizable kitchen component. Upon receiving user entries regarding the plurality of selectable features, the control circuit automatically defines a customized virtual three-dimensional kitchen component that comports with the user entries. The resultant customized virtual three-dimensional kitchen component can then be included in the final layout design for a kitchen and that final layout design outputted. That final layout design for the kitchen can then be used to physically construct a corresponding kitchen.

These selectable features made available for a given customizable kitchen component can be many and varied. By one approach these selectable features can include user-selectable physical dimensions (regarding, for example, physical dimensions regarding at least one of width, length, and height). By another approach, in lieu of the foregoing or in combination therewith, the selectable features can include one or more non-numeric aspects for one or more of the selectable features. These non-numeric aspects may or may not be mutually-exclusive choices depending upon the needs and/or opportunities presented by a given application setting.

By one approach, the control circuit automatically defines the customized virtual three-dimensional kitchen component that comports with the user entries by, at least in part, accessing information that describes a merged three-dimensional kitchen component that comprises an aggregation of all available user-selectable features for that particular categorical component (such as a particular appliance or fixture). The control circuit can then employ the user entries to delete unselected ones of the user-selectable features from this merged three-dimensional kitchen component to thereby define the customized virtual three-dimensional kitchen component.

By one approach the control circuit can be configured to automatically create and present to the user a unique name for the customized virtual three-dimensional kitchen component that comports with the user entries. If desired, at least part of this unique name can incorporate alphanumeric content that reflects at least some (and possibly all) of the user entries. Also if desired, the user can be provided with an opportunity to directly modify such an automatically generated unique name.

So configured, an automated kitchen design system can readily accommodate customized kitchen appliances and fixtures that are not already a part of an available library of defined kitchen components. These teachings are generally and relatively non-computationally intensive and can also require considerably less memory and file storage organization than other approaches contemplated in the prior art.

These and other benefits may become clearer upon making a thorough review and study of the following detailed description. Referring now to the drawings, and in particular to FIG. 1, an illustrative apparatus 100 that is compatible with many of these teachings will first be presented.

For the sake of an illustrative example it will be presumed here that a control circuit 101 carries out many, though not all, of the actions, steps, and/or functions of the process described herein. Being a "circuit," the control circuit 101 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 101 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 101 is configured (for example, by using corresponding programming as will be well understood by those skilled in the art) to carry out one or more of the steps, actions, and/or functions described herein.

In this example the control circuit 101 operably couples to a memory 102. This memory 102 may be integral to the control circuit 101 or can be physically discrete (in whole or in part) from the control circuit 101 as desired. This memory 102 can also be local with respect to the control circuit 101 (where, for example, both share a common circuit board, chassis, power supply, and/or housing) or can be partially or wholly remote with respect to the control circuit 101 (where, for example, the memory 102 is physically located in another facility, metropolitan area, or even country as compared to the control circuit 101).

In addition to architectural information and layout designs for a given kitchen and other data described herein, this memory 102 can serve, for example, to non-transitorily store the computer instructions that, when executed by the control circuit 101, cause the control circuit 101 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 101 also operably couples to a network interface 103. So configured the control circuit 101 can communicate with other elements via one or more intervening networks 104. Network interfaces, including both wireless and non-wireless platforms, are well understood in the art and require no particular elaboration here.

The control circuit 101 also operably couples to at least one user interface 105. This user interface 105 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, and so forth) to facilitate receiving information and/or instructions from a user and/or providing information to a user.

In a typical application setting the control circuit 101 will also communicatively couple to a printer 106. This printer 106 may be located proximal to the control circuit 101 (for example, within a few feet of the control circuit 101 or within a shared room, shared floor, or shared building with the control circuit 101) or may be located remotely with respect to the printer. These teachings will accommodate a wide variety of printers including black-and-white printers as well as color printers. Such a printer 106 can serve, for example, to print intermediate or final layout kitchen designs, narratives (as described herein), and so forth as desired.

In a typical application setting, and as illustrated in FIG. 1, a number of other network elements and/or entities are also included. Examples include, but are not limited to, one or more architects 107 (having, for example, one or more computers that couple to the control circuit 101 via the aforementioned network 104) as well as computers 108 for one or more construction contractors (represented here as a first construction contractor through an nth construction contractor where "N" is an integer greater than 1). Examples of relevant construction contractors include, but are not limited to, electricians, plumbers, and mechanical tradesmen who each have their corresponding training, licensing, and tools of the trade 112.

In many cases these construction contractor computers 108 will couple to a corresponding printer 109. This can include printers that are locally disposed with respect to the corresponding computer or remotely located printers (as maintained and offered by, for example, a third-party printing service). These printers 109 can serve to print the final layout design 110 that the construction contractors utilize to guide their activities when physically building out the corresponding kitchen 111. (These teachings will also accommodate construction contractors who prefer to work with active devices, such as computer tablets and pads, to view the final layout design while on-site.)

Referring now as well to FIG. 2, a process will be described having a number of steps including any number of optional steps. In a typical application setting many (but not necessarily all) of the steps illustrated in FIG. 2 are carried out by the aforementioned control circuit 101.

Figure 3A:
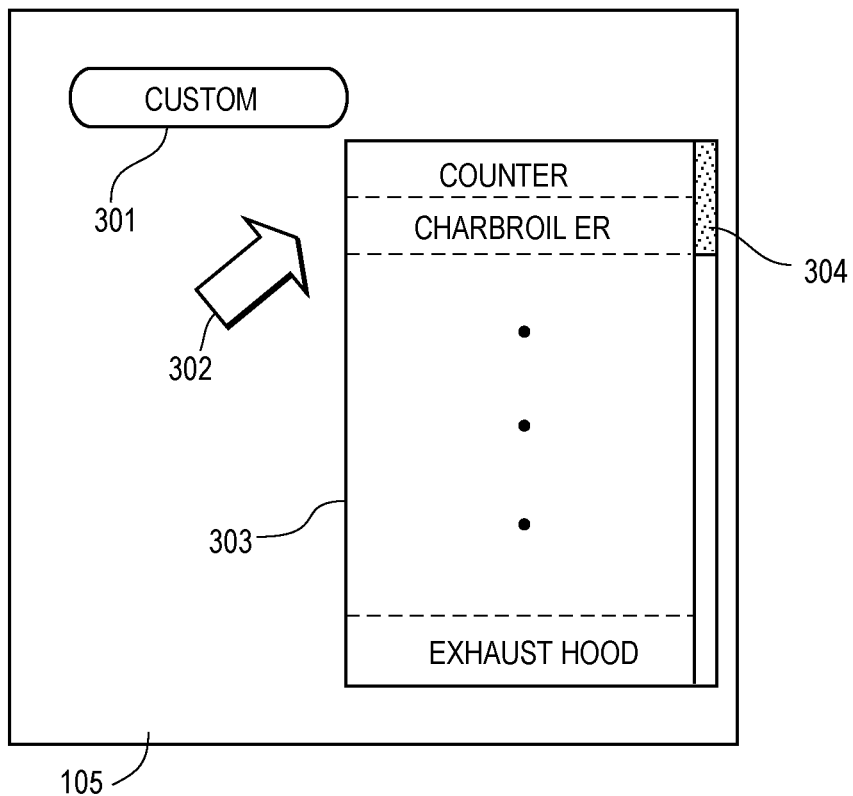

At block 201, the control circuit 101 provides a user with an opportunity to create a custom virtual three-dimensional kitchen component selected from a categorical list of available customizable kitchen components. By one approach, and with momentary reference to FIG. 3A, this opportunity can include presenting to the user via the aforementioned user interface 105 a user-selectable button 301 on a display screen. This user-selectable button 301 can bear an appropriate user-discernable moniker such as the word "custom."

By asserting this user-selectable button 301 (for example, by appropriate use of an on-screen cursor 302 and a selection/click capability as are well known in the art), a menu or sub-menu 303 that presents the aforementioned list of available customizable kitchen components can be responsively presented. In the illustrative example of FIG. 3, the list of available customizable kitchen components is presented as a stack of user-selectable component names that are arranged alphabetically by category. In an embodiment where the number of available customizable kitchen components exceeds the available display space, a scrolling mechanism (such as a selectable slider 304) can be provided to permit the user to selectively scroll through the entire list of available customizable kitchen components.

Figure 3B:
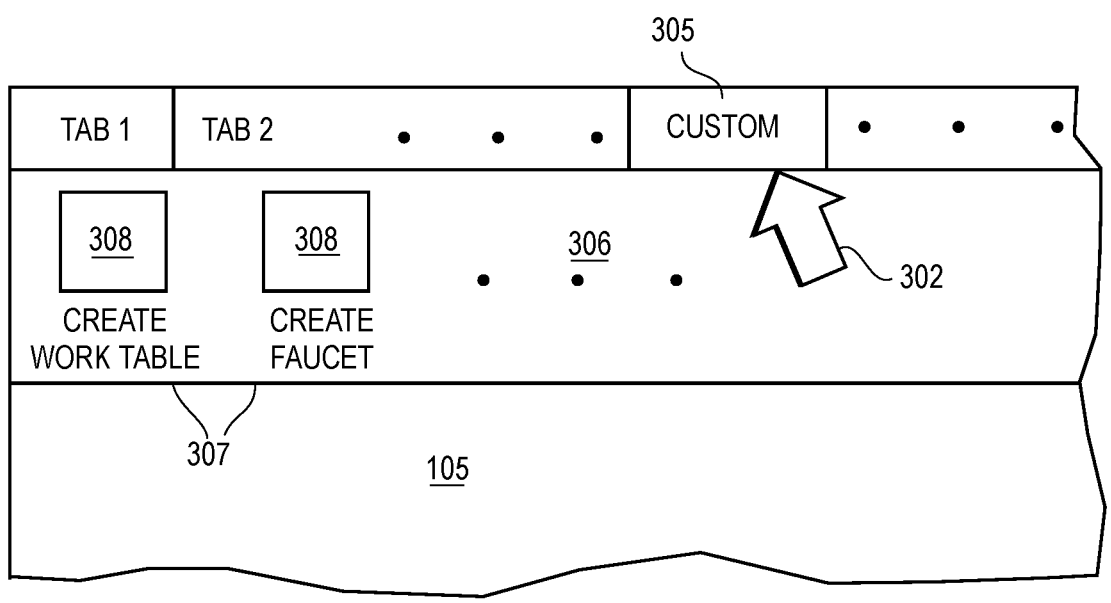

By another approach, and with momentary reference to FIG. 3B, this opportunity can include presenting to the user via the aforementioned user interface 105 a user-selectable tab 305 on a display screen. This user-selectable tab 305 can bear an appropriate user-discernable moniker such as the word "custom," "create," and so forth.

By asserting this user-selectable tab 305 (again, for example, by appropriate use of an on-screen cursor 302 and a selection/click capability as are well known in the art), ribbon 306 presents the aforementioned list of available customizable kitchen components. In the illustrative example of FIG. 3B, this ribbon 306 of available customizable kitchen components is presented as a series of user-selectable blocks 307 (with only two such blocks 307 being shown for the sake of clarity and simplicity) that each bear a corresponding component name and, if desired, a corresponding image to graphically illustrate or suggest the particular kitchen component associated with that block 307.

These teachings are highly flexible and will accommodate a wide variety of customizable kitchen components. Examples include, but are not limited to, a table, a faucet, a sink, a shelf, a mop basin, an exhaust hood, an exhaust fan, a refrigerated room, a refrigerator, a dishtable, a counter, an oven, a mixer, a fryer, a range, a charbroiler, a griddle, a kettle, a steamer, a food processor, a dishwasher, a warming cabinet, and a sneeze guard, to note but a few.

By one approach, this opportunity to create a custom virtual three-dimensional kitchen component can include, or be accompanied by, a presented opportunity to create a custom virtual three-dimensional kitchen component by selecting and combining at least two custom virtual three-dimensional kitchen components that were previously created by the user (or another party). This opportunity can comprise, for example, maintaining an inventory of such previously-created custom virtual three-dimensional kitchen components and presenting the user with selectable identifiers that each correlate to the items in that inventory. As one simple illustrative example in these regards, a user might select combining a previously customized faucet with a previously customized sink. Permitted combinations can include insertions, nesting, and other approaches as desired. The resultant combination may itself serve as a user customized virtual three-dimensional kitchen component or may serve as a starting point for further customization.

With continued reference to both FIGS. 2 and 3, this process 200 monitors for a user assertion of the above-described opportunity. In the illustrative example of FIG. 3, this can comprise monitoring for user assertion of the aforementioned button 301. In the absence of detecting an assertion event this process 200 can accommodate any of a variety of responses. Examples of responses can include temporal multitasking (pursuant to which the control circuit 101 conducts other tasks before returning to again monitor for an assertion event) as well as continually looping back to essentially continuously monitor for the assertion event(s). These teachings also accommodate supporting this detection activity via a real-time interrupt capability.

Upon detecting the user's assertion of the opportunity, at block 203 this process 200 automatically provides the user (via, for example, the user interface 105) with an interactive form that includes a plurality of selectable features for the selected customizable kitchen component. FIG. 4 presents an illustrative example of an interactive form 401 that presents a plurality of selectable features for a customizable kitchen worktable.

In this illustrative example the interactive form 401 includes a number of selectable features by which the worktable can be customized. As one example, the interactive form 401 includes a number of user-selectable physical dimensions 402. In this particular example the user-selectable physical dimensions include a first field 403 where the user can enter width information, a second field 404 where the user can enter length information, and a third field 405 where the user can enter height information for the worktable. In this example these fields are free text fields in which the user can enter a number of choice (such as a specific number of inches). So configured, this part of the interactive form 401 permits the user to input user-selectable physical dimensions as user-entered numeric dimensions. In this example each such field includes a corresponding cancel button 406 that the user can select to delete any entries already appearing in the corresponding field.

In this example the interactive form 401 also presents a plurality of choices regarding non-numeric aspects for various selectable features. In some cases, some of the non-numeric aspects for a particular selectable feature may be mutually-exclusive choices. As one example in these regards, reference 407 refers to an edge detail feature offering three non-numeric and mutually-exclusive choices (i.e., a flat edge, a rolled edge, and a marine edge).

In other cases, some of the non-numeric aspects for a particular selectable feature may not be mutually-exclusive choices. By way of illustration, reference numeral 408 refers to various optional components of a splash surface selectable feature. In addition to allowing a user to specify a particular numeric height via a corresponding data-entry field 409, the user can select a splash surface feature for any of the back of the worktable, the left side of the worktable, and/or the right side of the worktable by appropriate selection of corresponding selection boxes 410. Also in this illustrative example the user can select whether included splash surfaces have a closed back and/or turned up splash surfaces (again by way of corresponding selection boxes as denoted by reference numeral 411).

Other examples of non-numeric and non-mutually-exclusive choices for the worktable are found at reference numeral 412 and include, in this example, cross bracing, an undershelf, adjustable feet, and casters. By clicking upon the available selection boxes for any of these choices, the user can choose to include the corresponding feature in the customized worktable being specified via this interactive form 401.

Figure 5:
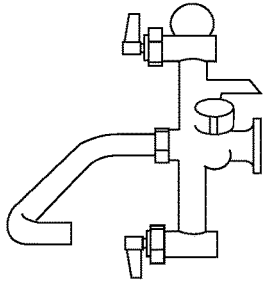

It will be understood that the details of the foregoing example are intended to serve an illustrative purpose and are not intended to suggest any particular limitations as regards these teachings. By way of further illustration, and again without intending any particular limitations by way of the specificity of the details conveyed, FIG. 5 presents an example of an interactive form 401 suitable for use in creating a customized faucet. This interactive form 401 provides a first area 501 where the user specifies a mounting height, a second area 502 where the user specifies a water size and type, a third area 503 where the user specifies whether the faucet is a deck faucet or a wall/splash faucet, a fourth area 504 where the user specifies a mounting width, a fifth area 505 where the user specifies a finish, a sixth area 506 where the user specifies a body style, a seventh area 507 where the user specifies handle details, an eighth area 508 where the user specifies a spout style, and a ninth area 509 where the user specifies any of a variety of spout options. By one approach, and as illustrated in FIG. 5, a preview area 510 can be simultaneously presented in conjunction with the interactive form 401 to present a preview image of the corresponding customized kitchen component that accords with the user's entries in the interactive form 401.

Referring again to FIG. 2, at block 204 this process 200 receives user entries corresponding to the entry opportunities provided in the aforementioned interactive form 401. As noted above, these entries can take various forms, but in a typical application setting may include both numeric and non-numeric entries. If desired, some entries can constitute a default entry that is utilized unless the user makes a specific alternative entry.

Referring to both FIGS. 2 and 4, one of the received user entries can constitute assertion of a "create" button 413 (or the like). Assertion of this button 413 concludes the user entry activity and can serve to actuate block 205 where the control circuit 101 then automatically defines a customized virtual three-dimensional kitchen component that comports with the user entries.

Generally speaking, the control circuit 101 defines the customized virtual three-dimensional kitchen component as a function of the user entries. By one approach, the control circuit 101 could begin with the proverbial "blank sheet of paper" and add graphic elements that comport with the various user entries. The applicant has determined, however, that such an approach can require providing, storing, and managing an extensive collection of graphic files and can also require considerable computation time to properly join the contents of selected files.

Figure 6:
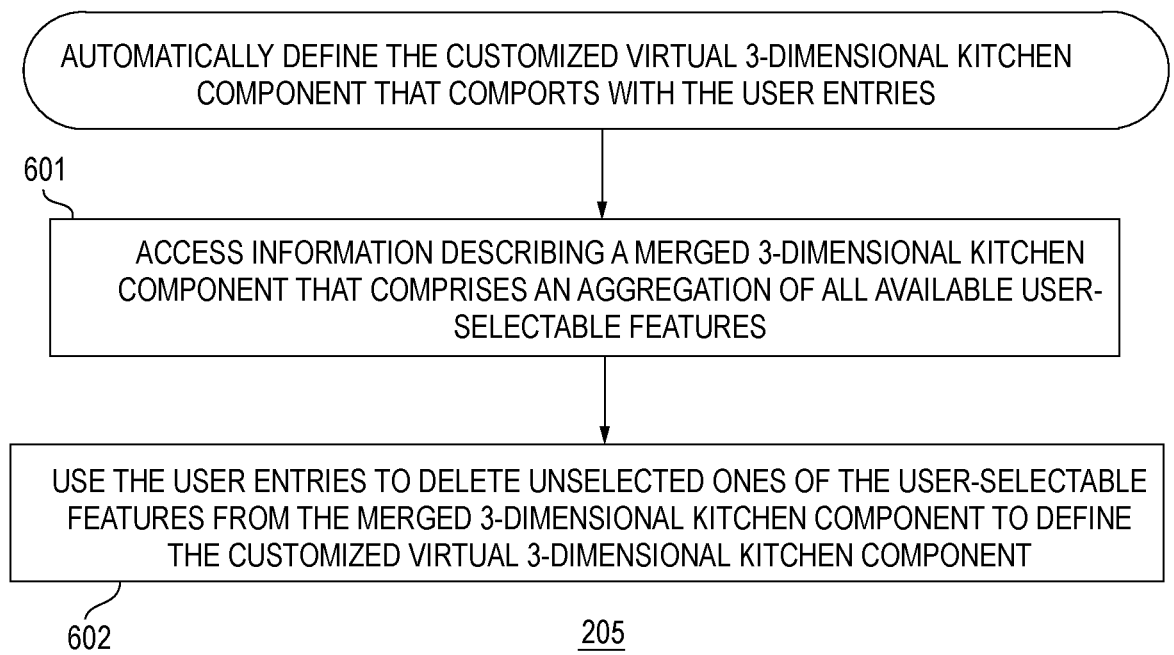
Figure 7:
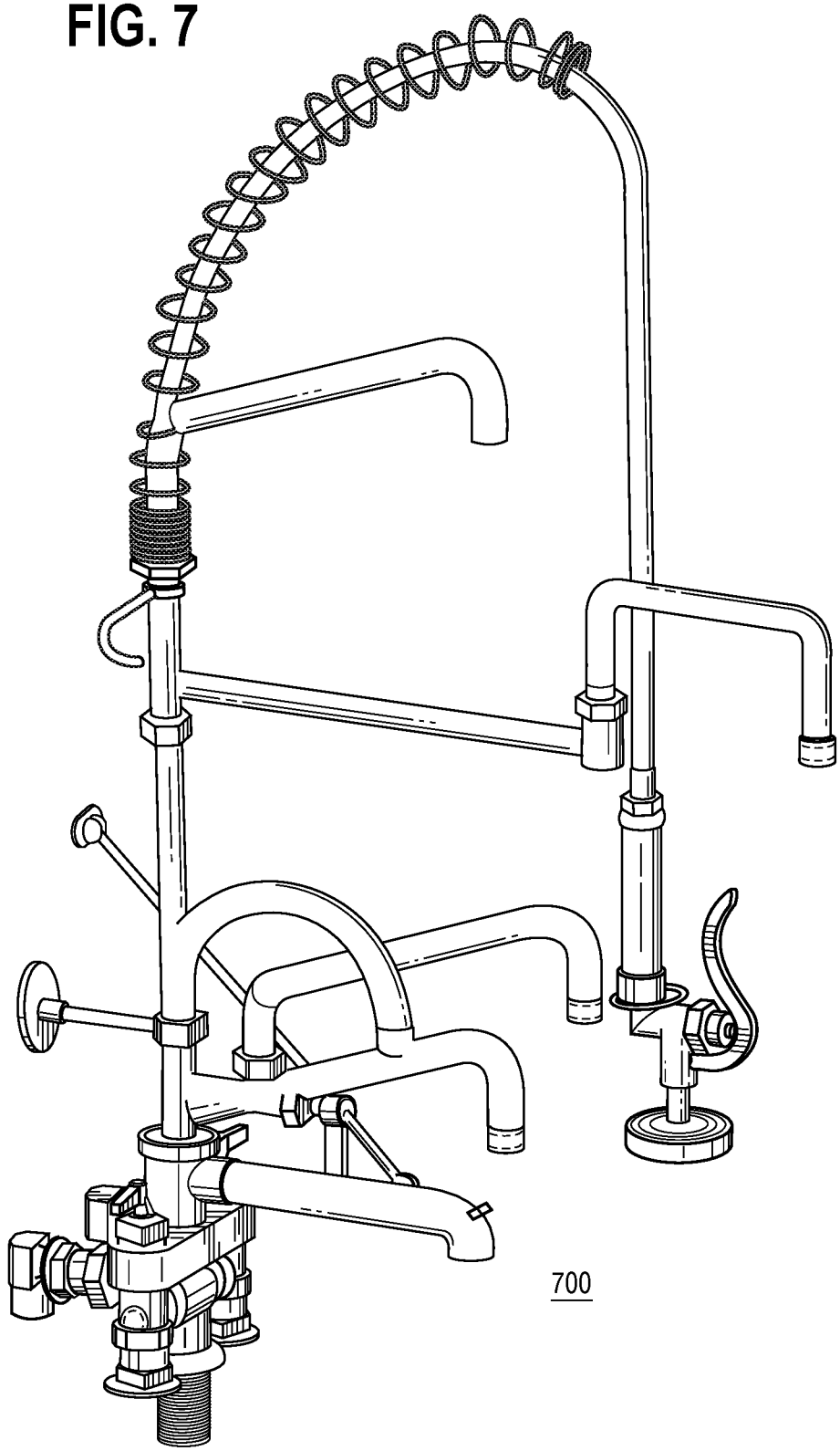

FIG. 6 presents an alternative approach to carrying out the activities of block 205. Pursuant to this approach, at block 601 the control circuit 101 accesses information describing a merged three-dimensional kitchen component that comprises an aggregation of all available user-selectable features for that particular categorical component. FIG. 7 presents an illustrative example in these regards. In particular, FIG. 7 presents a merged three-dimensional image 700 of a faucet that includes various spout options, handle options, and so forth. (By one approach, this merged three-dimensional image 700 constitutes a vector-based image such that its various dimensions can be readily scaled in accordance with numeric selections specified by the user.)

Referring again to FIG. 6, the control circuit 101 then employs the user entries to delete unselected ones of the user-selectable features from the merged three-dimensional kitchen component image data to thereby define the customized virtual three-dimensional kitchen component.

Using the approach represented in FIG. 6 and illustrated in FIG. 7, these teachings can employ considerably fewer support files thereby significantly reducing memory and file-management requirements. In addition, using the user entries to create and define the custom component can be completed using less computational power and/or computation time than would otherwise be expected and required.

With continued reference to FIG. 2 and referring back again to FIGS. 4 and 5, at optional block 206 the control circuit 101 can be configured to automatically create and present to the user a unique name 414 for the customized virtual three-dimensional kitchen component that comports with the user entries. By one approach, the unique name can incorporate, at least in part, alphanumeric content that reflects some of the user entries. As a simple example in these regards, and referring to the unique name 414 shown in FIG. 4, alphanumeric expression "BLR" can represent that the back splashes for the worktable are present at the back, left side, and right side thereof.

If desired, and as illustrated at optional blocks 207 and 208, the user can be permitted to modify any automatically generated name. In the examples of FIGS. 4 and 5, the user may be permitted to select all or part of the automatically-generated unique name and then delete or otherwise modify the selected portion. The user can also be permitted, in lieu of the foregoing or in combination therewith, to add to the automatically generated unique name (for example, by concatenating additional alphanumeric content to the beginning or conclusion of the automatically generated character string). By yet another approach the user can be permitted to delete the entire automatically generated character string and replace it completely with user-chosen content.

By one approach, the control circuit 101 can be configured to use the alphanumeric content of an automatically created unique name as described above to create a pre-configured interactive form that contains a plurality of pre-selected user-editable features that match the customized virtual three-dimensional kitchen component represented by that unique name. In a case where the unique name completely describes the attributes of a particular customized kitchen component, such an approach allows a given customized kitchen component to be effectively stored as nothing more than its unique alphanumeric name (i.e., an alphanumeric character string). This approach avoids a need to store more voluminous graphic content while nevertheless allowing the corresponding custom virtual three-dimensional kitchen component to be readily rendered when needed.

Figure 8:
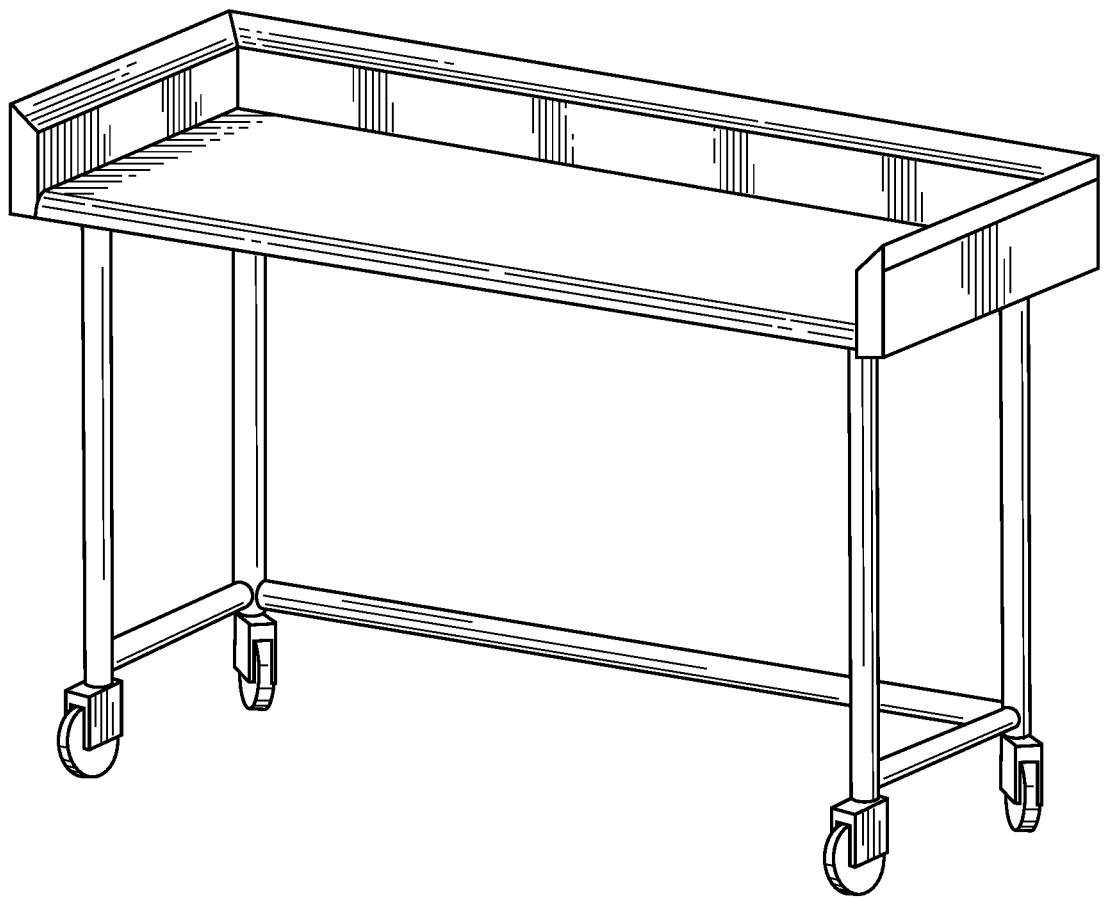

FIG. 8 presents an illustrative example of a custom virtual three-dimensional kitchen component comprising a worktable that represents the corresponding user entries regarding such things as dimensions, splash surfaces, cross bracing, casters and so forth per the described process 200.

At block 209 the user, via the control circuit 101, includes the customized virtual three-dimensional kitchen component in the final layout design for a given kitchen design. At block 210 the control circuit 101 can then output the final layout design for the kitchen (which of course includes the customized virtual three-dimensional kitchen component). By one approach this can comprise printing part or all of the final layout design using one or more of the above described printers 106, 109.

Figure 9:
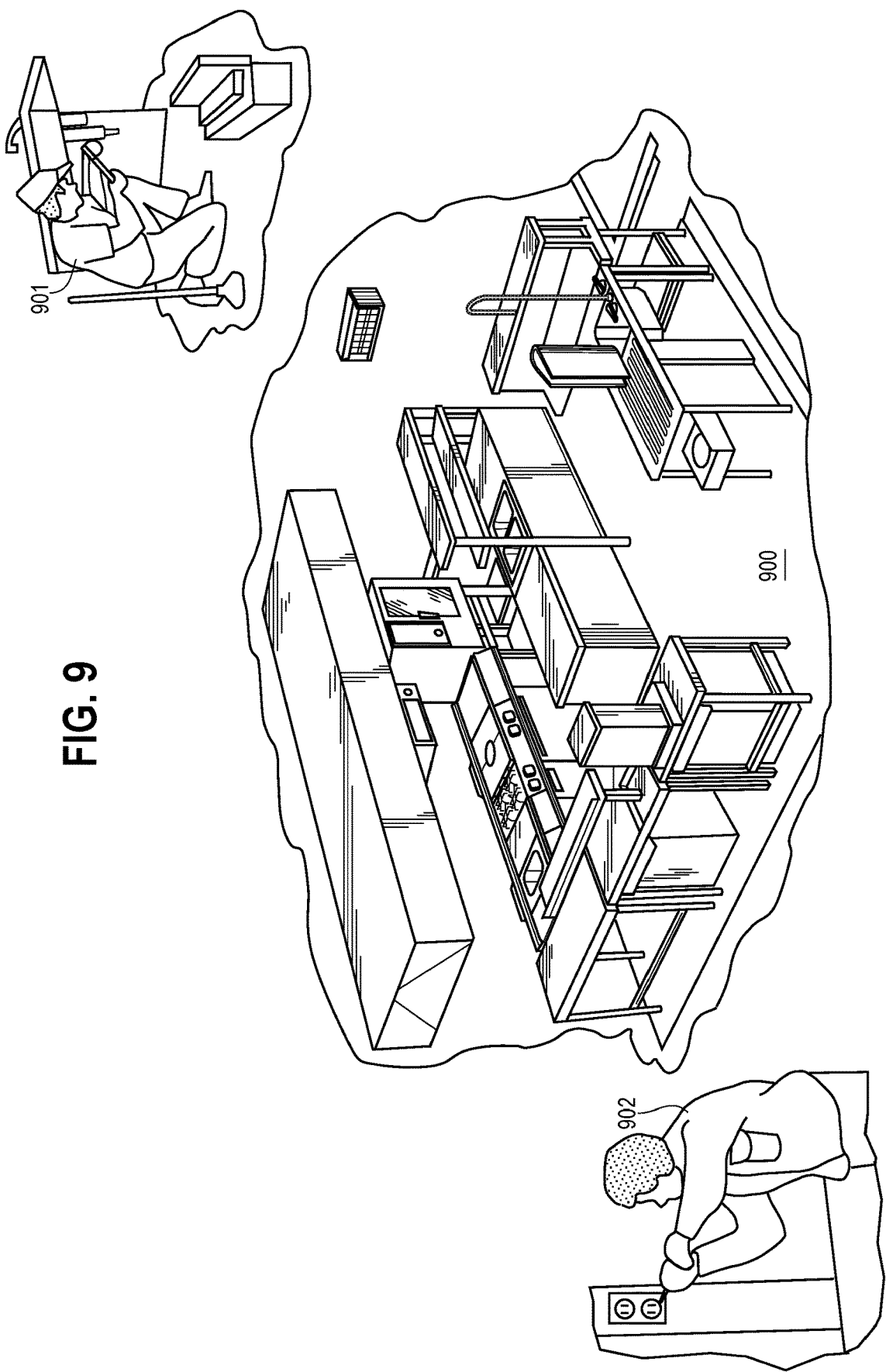

Any or all of the foregoing steps can be performed, in whole or in part, by the above-described control circuit 101 as desired. With continued reference to FIG. 2 and also referring now to FIG. 9, however, in a typical application setting the control circuit 101 does not serve to physically construct the designed kitchen. Instead, as illustrated at block 211 and FIG. 9, trained persons (including employees and/or third-party contractors as desired) such as the illustrated electrician 902 and plumber 901 use the final layout design for the kitchen as provided by the control circuit 101 to physically construct the kitchen 900. These physical actions include, for example, placing and installing appliances and fixtures per the final layout design for the kitchen, routing and installing electrical outlets, connections, switches and other elements per the final layout design for the kitchen, routing and installing plumbing connections per the final layout design for the kitchen, and routing and installing various mechanical elements (such as natural gas connections, pneumatic ductwork, and so forth) per the final layout design for the kitchen.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A method of constructing a commercial kitchen ("kitchen") in accordance with a final layout design for the kitchen, the method comprising:
    by a control circuit:
        providing a user with an opportunity to create a custom virtual three-dimensional kitchen component comprising a faucet selected from a list of available customizable kitchen components;
        upon detecting the user's assertion of the opportunity, automatically providing the user with an interactive form that includes a plurality of selectable features for a selected customizable kitchen component, wherein for the faucet the selectable features include opportunities to specify faucet mounting height, water type, water size, handle details, and spout details;
    receiving user entries with respect to the plurality of selectable features;
    automatically defining a customized virtual three-dimensional kitchen component that comports with the user entries;
        including the customized virtual three-dimensional kitchen component in the final layout design for the kitchen; and
        outputting the final layout design for the kitchen; and
    using the final layout design for the kitchen to physically construct the kitchen.

2. The method of claim 1 wherein the available customizable kitchen components further include at least one of:
    a table;
    a sink;
    a shelf;
    a mop basin;
    an exhaust hood;
    an exhaust fan;
    a refrigerated room;
    a refrigerator;
    a dishtable;
    a counter;
    an oven;
    a mixer;
    a fryer;
    a range;
    a charbroiler;
    a griddle;
    a kettle;
    a steamer;
    a food processor;
    a dishwasher;
    a warming cabinet;
    a sneeze guard.

3. The method of claim 1 wherein the plurality of selectable features includes user-selectable physical dimensions.

4. The method of claim 3 wherein the user-selectable physical dimensions include at least one of width, length, and height.

5. The method of claim 4 wherein the control circuit is further configured to input the user-selectable physical dimensions as user-entered numeric dimensions.

6. The method of claim 1 wherein the plurality of selectable features includes a plurality of mutually-exclusive choices regarding a non-numeric aspect for a particular one of the selectable features.

7. The method of claim 6 wherein the non-numeric aspect constitutes an edge of the selectable feature.

8. The method of claim 6 wherein the non-numeric aspect constitutes an optional component of the selectable feature.

9. The method of claim 8 wherein the optional component comprises a multi-sided backsplash surface.

10. The method of claim 1 wherein the control circuit is configured to automatically define the customized virtual three-dimensional kitchen component that comports with the user entries by, at least in part:
    accessing information describing a merged three-dimensional kitchen component that comprises an aggregation of all available user-selectable features;
    using the user entries to delete unselected ones of the user-selectable features from the merged three-dimensional kitchen component to define the customized virtual three-dimensional kitchen component.

11. The method of claim 1 wherein the plurality of selectable features includes a plurality of choices regarding a plurality of non-numeric aspects for a particular one of the selectable features.

12. The method of claim 1 wherein at least one of the plurality of choices are non-mutually-exclusive.

13. The method of claim 12 wherein the plurality of non-mutually exclusive choices comprises at least one of:
    cross-bracing;
    a shelf;
    adjustable feet;
    casters.

14. The method of claim 1 wherein the control circuit is further configured to:
    automatically create and present to the user a unique name for the customized virtual three-dimensional kitchen component that comports with the user entries.

15. The method of claim 14 wherein the control circuit is further configured to automatically create and present to the user a unique name for the customized virtual three-dimensional kitchen component that comports with the user entries by, at least in part, incorporating alphanumeric content that reflects at least one of the user entries.

16. The method of claim 15 wherein the control circuit is further configured to:
    use the alphanumeric content to create a pre-configured interactive form that contains a plurality of pre-selected user-editable features that match the customized virtual three-dimensional kitchen component.

17. The method of claim 14 wherein the control circuit is further configured to provide the user with an opportunity to directly modify the unique name.

18. The method of claim 1 wherein the control circuit is further configured to provide the user with the opportunity to create a custom virtual three-dimensional kitchen component selected from a list of available customizable kitchen components by, at least in part, also providing the user with an opportunity to create a custom virtual three-dimensional kitchen component by selecting and combining at least two custom virtual three-dimensional kitchen components that were previously created by the user.

19. The method of claim 1 wherein the control circuit is further configured to provide the user with the opportunity to create a custom virtual three-dimensional kitchen component selected from a list of available customizable kitchen components by, at least in part, also providing the user with an opportunity to select a previously-created custom virtual three-dimensional kitchen component as previously created by the user from an inventory of previously-created custom virtual three-dimensional kitchen components.

* * * * *